T. G. Eiswald,
Washing Machine,

№ 21,875. Patented Oct. 26, 1858.

UNITED STATES PATENT OFFICE.

T. G. EISWALD, OF PROVIDENCE, RHODE ISLAND.

WASHING-MACHINE.

Specification of Letters Patent No. 21,875, dated October 26, 1858.

*To all whom it may concern:*

Be it known that I, THEODORE G. EISWALD, of the city and county of Providence and State of Rhode Island, have invented a new and useful Improvement Upon Machines for Washing Clothes; and I do hereby declare that the following is a full, clear, and exact description of the construction and operation of it, reference being had to the annexed drawings, making a part of this specification, in which—

Figure 1:
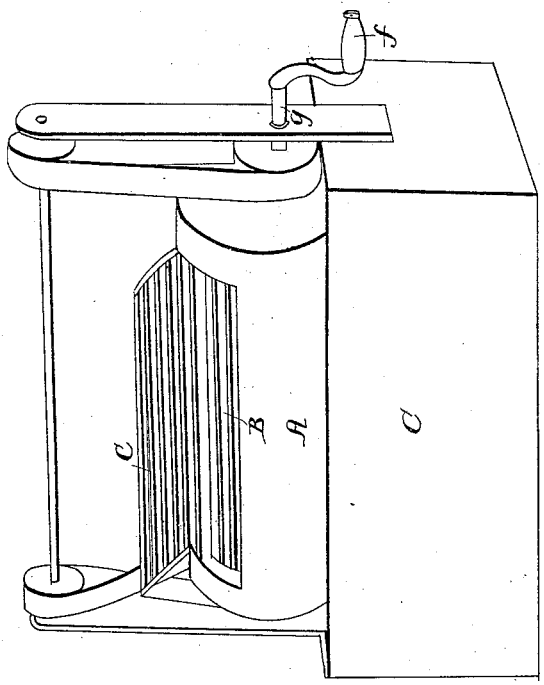
Figure 3:
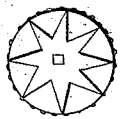
Figure 2:
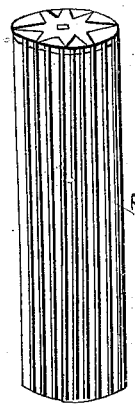
Figure 4:
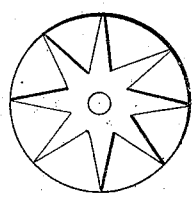

Figure 1 represents, the whole machine; Fig. 2, the inner cylinder or partition; Fig. 3, the ends or drawheads of the inner cylinder; Fig. 4, the inner drum head of the outer cylinder or partition.

The accompanying drawing will show the manner in which the machine works and its parts.

"A" is the outer cylinder which is made to revolve one way by a cross belt " e."

"B" is the inner cylinder which is made to revolve in the opposite direction by being connected with crank " f," so that the same power applied to crank " f," acts upon shaft " G," thus causing the two cylinders to rotate around a common center at the same time and in opposite directions. Cog wheels may be used instead of belting to obtain the same motion, as they are much cheaper.

" C " is a large box on which the machine is placed.

Figs. 3 and 4 exhibit the manner in which it is proposed to place the layers or lines of rubber or other hard substance on the drum head of the outer and inner cylinders, so as to come nearly in contact only at the center.

Fig. 2 letter " B " shows the layers or lines of rubber, or some other hard substance at the surface of the inner, and Fig. 1 letter " C " shows the layers on the interior of the outer cylinder.

What I claim and desire to secure by Letters Patent is—

The arrangement, construction and combination of the two cylinders, A, B, revolving in different directions, substantially as and for the purposes herein shown and described.

THEODORE G. EISWALD.

Witnesses:
JAMES E. BLACKMAR,
GEORGE W. BALLOU.